3,369,855
LEVELLING SULFUR AND VAT DYES WITH LOW MOLECULAR WEIGHT POLYAMIDES
Bjarne Hartmark, Hambach, Weinstrasse, Hans-Gerhard Reppe, Ludwigshafen (Rhine), Rudolf Rokohl, Ludwigshafen-Oppau (Rhine), and Matthias Seefelder, Ludwigshafen-Gartenstadt (Rhine), Germany, assignors to Badische Anilin- & Soda-Fabrik Aktiengesellschaft, Ludwigshafen (Rhine), Germany
No Drawing. Filed Oct. 24, 1961, Ser. No. 147,148
Claims priority, application Germany, Oct. 29, 1960, B 59,915
8 Claims. (Cl. 8—34)

This invention relates to a process for dyeing textile materials with vat and sulfur dyes using auxiliaries for leveling which have not hitherto been used for the purpose.

Dyeings prepared with sulfur and vat dyes are often uneven. Various substances have been proposed to obviate this defect and to act as leveling agents for dyeings prepared with the said classes of dyes. It is known to use for this purpose low molecular weight betaine compounds, for example those derived from pyridine and chloroacetic acid or from C-alkyl pyridines and β-hydroxy-γ-chloropropane-sulfonic acid. Pyrrolidone and its simple N-alkyl, N-acyl and N-hydroxyalkyl derivatives, and also high molecular weight polymers of vinylpyrrolidone have been recommended as auxiliaries for vat dyeings. These known agents have however not proved entirely satisfactory, partly because they only exhibit any appreciable action in high concentrations and partly because they exert too strong a retarding action.

It is an object of the present invention to carry out leveling during dyeing using agents which do not interfere with the dyeing process. A further object is to level uneven dyeings subsequently. Another object is to use for leveling agents which have an especially strong leveling action on vat and sulfur dyes without having any substantial retarding effect. Further objects of the invention will become apparent from the following detailed description of our invention.

We have found that outstandingly level sulfur and vat dyeings are obtained on fibers of natural or regenerated cellulose and on wool by using as leveling agent a water-soluble polyamide derived from (a) an aliphatic, cycloaliphatic, or aromatic polyamine or a heterocyclic compound which contains at least two acylatable nitrogen atoms and (b) an α,β-unsaturated carboxylic acid, an aliphatic polycarboxylic acid, an aliphatic polycarboxylic acid containing one or more hetero atoms, or a functional derivative of these which is capable of amide formation.

The term "water-soluble" as used in the present specification means that the polyamide to be used as leveling agent must be soluble in the aqueous, alkaline-reacting dyebaths or leveling baths. Suitable initial materials of the type specified under (a) include aromatic polyamines with at least 2 acylatable nitrogen atoms, especially those which contain in the molecule 1 or 2 benzene or naphthalene rings in addition to 2 acylatable nitrogen atoms. Suitable cycloaliphatic polyamines are the hydrogenation products of aromatic polyamines of the said kind. Such initial materials (a) include phenylene diamines, xylylene diamines, toluylene diamines, 4,4'-diaminodiphenylmethane, N,N' - di - (secondary-butyl)-p-phenylene diamine, 1,5-naphthalene diamine and their hydrogenation products, such as 1,2-diaminocyclohexane and 4,4'-diaminodicyclohexylmethane.

Examples of heterocyclic compounds containing at least two acylatable nitrogen atoms are piperazines substituted at the carbon atom by low molecular weight alkyl groups, such as 2-methylpiperazine and 2,5-diethylpiperazine.

As leveling agents those water-soluble polyamides are especially suitable for the purposes of the present invention for the production of which polyamines of the following general formula have been used as initial materials:

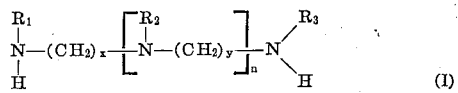

In this formula, $R_1$ and $R_3$ stand for hydrogen, alkyl or hydroxyalkyl radicals with 1 to 4 carbon atoms or, when $x$ is 2 and $n$ is 0, together represent an ethylene radical; $R_2$ is hydrogen, an alkyl or hydroxyalkyl radical with 1 to 4 carbon atoms; $x$ and $y$ are integers from 1 to 6 and $n$ is one of the integers 0 to 20, the sum of $x$ and $n$ being greater than or equal to 2. Those polyamines which correspond to the above general Formula I for $n$ is 0 to 3 are especially important for reasons of accessibility. Examples of especially preferred polyamines of Formula I are ethylene diamine, hydroxyethyl-ethylene diamine, hexamethylene diamine, di-(aminopropyl)-ethylene diamine, diethylene triamine, N-propyl-diethylene triamine, triethylene tetramine, dipropylene triamine, tripropylene tetramine, N-methyl-dipropylene triamine, tripropylene tetramine, N-methyl-dipropylene triamine, di-(ethylaminoethyl)-amine and piperazine.

The initial materials specified under (b) may be α,β-unsaturated carboxylic acids, preferably those of the general formula

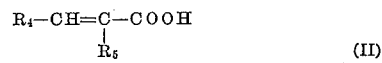

where $R_4$ is a hydrogen atom or an alkyl radical with up to 3 carbon atoms and $R_5$ is a hydrogen atom or a methyl radical. Examples are acrylic acid, methacrylic acid, crotonic acid and tiglic acid. Acrylic acid and methacrylic acid are preferred, as they are especially readily accessible. The substances (b) may also be saturated or unsaturated aliphatic polycarboxylic acids, preferably saturated dicarboxylic acids with a chain of 1 to 6 carbon atoms between the two carboxyl groups, which have the general formula $$\text{HOOC—C}_m\text{H}_{2m}\text{—COOH} \qquad (III)$$

where $m$ is one of the integers 1 to 6, and dicarboxylic acids with a single unsaturation and a chain of 2 to 6 carbon atoms between the two carboxyl groups, which have the general formula $$\text{HOOC—C}_p\text{H}_{2p-2}\text{—COOH} \qquad (IV)$$

where $p$ is one of the integers 2 to 6. Such acids include malonic acid, succinic acid, glutaric acid, adipic acid, pimelic acid, suberic acid, maleic acid and fumaric acid. Furthermore, aluphatic carboxylic acids which contain hetero atoms, especially oxygen, sulfur or nitrogen atoms, in the skeleton of the aliphatic molecule, may also be used as initial materials of group (b). The preferred acids of this type can be illustrated by the general formula $$(\text{HOOC—(CH}_2)_o\text{—})_z\text{Q} \qquad (V)$$

where Q is —O—, —S—,

or >N—CH$_2$—CH$_2$—N<, $o$ is one of the integers 1 to 3 and $z$ in the number of valencies of Q, i.e., 2 when Q is —O— or —S—, 3 when Q is

and 4 when Q is >N—CH$_2$—CH$_2$—N<. Examples are dipropyl ether-γ,γ'-dicarboxylic acid, thiodibutyric acid, ethylenediaminotetracetic acid and nitrilotriacetic acid.

Instead of the free acids, there may also be used as substances of group (b) the functional derivatives of the above-mentioned polycarboxylic acids which are capable of amide formation, i.e. their halides, especially chlorides and bromides, anhydrides, amides or esters. The substances to be used as leveling agents according to this invention may be prepared from the above-mentioned initial materials by known methods, for example by condensing the substances of group (a) with the substances of group (b) in the presence or absence of inert solvents, such as glycerol, polyglycols of a boiling point above 160° C. and tetrahydronaphthalene. The relative proportions of the reactants are preferably chosen so that when using saturated polycarboxylic acids or functional derivatives thereof there are 1 to 3, preferably 1 to 1.5, primary and/or secondary amino groups available for each carboxyl group, and when using unsaturated carboxylic acids and functional derivatives thereof there is a total of 0.7 to 3, preferably 1 to 1.5, primary and/or secondary amino groups available for each carboxyl group and each reactive double bond.

When using α,β-unsaturated carboxylic acids as initial materials it may be advantageous to add small amounts of compounds which prevent autopolymerization of these unsaturated substances, for example hydroquinone or methylene blue. The condensation temperature to be used depends on the nature of the initial material, especially on the nature of component (b). If the polyamines are reacted with free acids, acid anhydrides, acid amides or acid esters, it has proved advantageous to carry out condensation in the absence of solvents at temperatures between 170° and 225° C., preferably at 200° C. The condensation of the amines with acid halides, however, is carried out especially advantageously at room temperature in the presence of one of the above-mentioned solvents and a proton acceptor, such as pyridine or a tertiary aliphatic amine. The duration of the condensation is as a rule between about 10 and about 60 minutes depending on the components used. In any case, the reaction should be discontinued before the products formed have become water-insoluble; this is easily ascertained by testing samples withdrawn during the reaction.

The water-soluble condensates formed in this way have as a rule a mean molecular weight between 600 and 1500.

They are composed of substantially alternating radicals A and B, A being radicals of aliphtic, cycloaliphatic or aromatic polyamines or of heterocycles containing at least 2 acylatable nitrogen atoms, and B being radicals of α,β-unsaturated monocarboxylic acids or of aliphatic polycarboxylic acids that may contain a carbon-carbon double bond or hetero atoms. Especially important as leveling agents for vat and sulfur dyes are those water-soluble polyamides which are made up of radicals A of the general formula $$-\overset{R_1}{\underset{|}{N}}-(CH_2)_x-\left[\overset{R_2}{\underset{|}{N}}-(CH_2)_y-\right]_n \overset{R_3}{\underset{|}{N}}- \quad (VI)$$

and of radicals B of the general formulae $$-\underset{R_4}{\overset{|}{CH}}-\underset{R_5}{\overset{|}{CH}}-CO- \quad (VII)$$

$$-CO-C_mH_{2m}-CO- \quad (VIII)$$

$$-CO-C_pH_{2p-2}-CO \quad (IX)$$

and $$(-CO-(CH_2)_o-)_zQ \quad (X)$$

where $R_1$ to $R_5$, $x$, $y$, $n$, $m$, $o$, $p$, $z$ and Q have the meanings given above for Formulae (I) to (V).

For economic reasons, those polyamides are preferred which as components A contain the following radicals

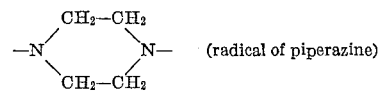 (radical of piperazine)

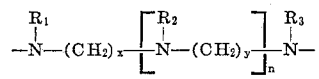 (radicals of dipropylene triamine)

$$-NH-(CH_2)_3-NH-(CH_2)_3-NH-$$
$$-NH-(CH_2)_2-N-(CH_2)_2-NH_2$$
$$\quad\quad\quad\quad\quad\quad |$$
and $-NH-(CH_2)_2-N-(CH_2)_2-NH-$
$$\quad\quad\quad\quad\quad |$$
(radicals of diethylene triamine)

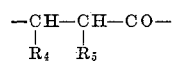
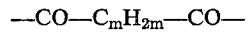
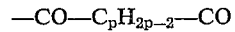
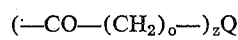
(radicals of N-methyldipropylene triamine)

$$-NH-(CH_2)_2-NH-(CH_2)_2-NH-(CH_2)_2-NH-$$
$$-NH-(CH_2)_2-N-(CH_2)_2-NH-(CH_2)_2-NH_2$$
$$\quad\quad\quad\quad |$$
$$-NH-(CH_2)_2-NH-(CH_2)_2-N-(CH_2)_2-NH_2$$
$$\quad\quad\quad\quad\quad\quad\quad\quad\quad |$$
$$-NH-(CH_2)_2-NH-(CH_2)_2-N-(CH_2)_2-NH-$$
$$\quad\quad\quad\quad\quad\quad\quad\quad\quad |$$
(radicals of triethylene tetramine)

and the like.

Of the said polyamides, those are of special technical importance which, besides radicals A of Formula VI, contain the following radicals B:

| | |
|---|---|
| $-CH_2-CH_2-CO-$ | (radical of acrylic acid) |
| $-CH_2-CH-CO-$<br>$\quad\quad\quad\lvert$<br>$\quad\quad\quad CH_3$ | (radical of methacrylic acid) |
| $-CO-CH_2-CH_2-CO-$ | (radical of succinic acid) |
| $-CO-(CH_2)_4-CO-$ | (radical of adipic acid) |
| $-CO-(CH_2)_6-CO-$ | (radical of suberic acid) |
| $-CO-CH=CH-CO-$ | (radical of maleic acid or fumaric acid) |
| $-CO-(CH_2)_3-O-(CH_2)_3-CO-$ | (radical of dipropyl ester-γ,γ'-dicarboxylic acid) |
| $-CO-(CH_2)_3-S-(CH_2)_3-CO-$ | (radical of thiodibutyric acid) |
| $-CO-CH_2-N-CH_2-CO-$<br>$\quad\quad\quad\quad\lvert$<br>$\quad\quad\quad\quad CH_2-CO-$ | (radical of nitrilotriacetic acid) |
| $-CO-CH_2\quad\quad\quad CH_2-CO-$<br>$\quad\quad\quad\quad\diagdown\quad\quad\diagup$<br>$\quad\quad\quad\quad N-CH_2-CH_2-N$<br>$\quad\quad\quad\quad\diagup\quad\quad\diagdown$<br>$-CO-CH_2\quad\quad\quad CH_2-CO-$ | (radical of ethylene diamine tetracetic acid) |

The production of the substances to be used according to this invention is described in greater detail in the following examples, although no claim is made to the actual method of production. The parts specified in the examples are parts by weight.

*Example I*

47.5 parts of dipropyl ether-γ,γ'-dicarboxylic acid and 33 parts of dipropylene triamine are heated for an hour at 200° C. while stirring and simultaneously distilling off the volatile constituents. 68 parts of a pale brown viscous oil is obtained which readily dissolves in water.

*Example II*

54 parts of acrylic acid is heated with 31 parts of dipropylene triamine and 0.1 part of hydroquinone for 30 minutes at 200° C. while stirring, the water formed in the reaction being distilled off at the same time. 70 parts of the desired oligomeric polyamide is obtained as a viscous brownish colored resin of good solubility in water.

*Example III*

54 parts of acrylic acid, 98 parts of dipropylene triamine and 0.1 part of hydroquinone are heated for 30 minutes at 200° C. while stirring and distilling off the water of reaction. 132 parts of a brown viscous oil is obtained which dissolves readily in water.

*Example IV*

51.5 parts of $\gamma,\gamma'$-thiodibutyric acid and 26 parts of diethylene triamine are heated to 180° C. for 30 minutes while stirring. The water formed in the reaction is distilled off at the same time. 67 parts of a brown highly viscous liquid is obtained which readily dissolves in water with a basic reaction.

*Example V*

47.7 parts of nitrilotriacetic acid and 32 parts of piperazine are stirred for 30 minutes at 180° C. The reaction water is distilled off at the same time. 65 parts of a viscous brown resin is obtained which readily dissolves in water.

The following further initial materials, given by way of example, may be condensed to form leveling agents in an analogous manner:

VI: Succinic acid and piperazine in the mole ratio 1:1.5 according to Example V.
VII: Maleic acid and diethylene triamine in the mole ratio 1:1 according to Example II.
VIII: Suberic acid and piperazine in the mole ratio 1:1.5 according to Example V.
IX: Dipropyl ether-$\gamma,\gamma'$-dicarboxylic acid and piperazine in the mole ratio 1:2 according to Example I.
X: Thiodibutyric acid and N-methyldipropylene triamine in the mole ratio 1:1 according to Example IV.
XI: Nitrilotriacetic acid and diethylene triamine in the mole ratio 1:3 according to Example V.
XII: Ethylene diaminotetracetic acid and piperazine in the mole ratio 1:4 according to Example V.
XIII: Acrylic acid and piperazine in the mole ratio 1:1 according to Example II.
XIV: Dipropyl ether-$\gamma,\gamma'$-dicarboxylic acid and piperazine in the mole ratio 1:1 according to Example I.
XV: Adipic acid and piperazine in the mole ratio 1:1 according to Example V.
XVI: Maleic acid and piperazine in the mole ratio 1:1 according to Example II.

The agents obtainable according to the above methods have dye affinity and have excellent leveling action in dyeing with vat and sulfur dyes even when used in very low concentrations. As a rule, they are used in concentrations of 0.2 to 1 gram per liter of treatment bath. For the rest, the approved dyeing methods with the said dyes from alkaline baths remain unchanged when using the leveling agents according to the present invention. The leveling agents according to this invention give especially advantageous results with vat dyes with very low migratory power, whose use for dyeing has hitherto caused great difficulty. They have no surface-active properties and develop no foam in the dyebath; nor do they have any dye-dispersing or protective colloid properties.

Their slight retarding action deserves special mention. As a result of this property, outstandingly level dyeings can be obtained by the present invention without having to accept substantial losses of dye. Any type of fiber which can be dyed with vat and sulfur dyes can be successfully dyed level shades at any processing stage, for example as flock, sliver, skein or piece goods, in the presence of the said leveling agents. Moreover, the leveling agents may be used for subsequently leveling out uneven dyeings. A further advantage is that shading can be carried out at any temperature in the presence of the new agents, even at the maximum temperature sometimes required for vat dyes; this means that any amount of dye may be added without the dyeing temperature having to be lowered, as would otherwise be necessary.

The agents may be used in conjunction with any protective colloids and dispersing agents conventional in vat dyeing, such as formaldehyde naphthalenesulfonic acid condensation products or ligninsulfonic acids. The addition of dispersing agents is necessary, for example, when industrial water which contains appreciable amounts of Ca- and Mg-ions has to be used for the preparation of the dyebaths.

It is known that condensation products derived from polyethylene polyamines and dicarboxylic or disulfonic acid halides form with the majority of the water-soluble dyes, water-insoluble precipitates, so-called lakes, and can therefore be used for waterproofing dyeings with such water-soluble dyes.

It is also known that high molecular weight condensation products derived from compounds with at least two reactive groups, which can react with each other with the formation of esters or amides, can be used as animalizing agents for cellulose fibers; high molecular weight compounds derived from aliphatic amines with at least two amino groups and halogen-free aliphatic $\alpha,\beta$-unsaturated monocarboxylic acids have also been proposed for the same purpose. Animalizing agents must have affinity for the fiber in view of their application. It was therefore not to be foreseen that the substances to be used according to this invention would be excellent leveling agents with dye affinity for use with vat and sulfur dyes, which would not form any insoluble precipitates whatever with the water-soluble reduced forms of these dyes.

The following examples illustrate the use of the leveling agents according to the invention. The percentages in these examples are units of weight. They relate to the dry weight of the textile material to be treated.

EXAMPLE 1

Skein yarn of cotton is dyed for 45 minutes at 60° C. and the liquor ratio 20:1 with 2% of a violet vat dye (C.I. 60,005/1956) according to the conventional IN method without adding auxiliaries in a vat which contains 5 g./l. sodium dithionite and 12 ml./l. sodium hydroxide solution (38° Bé.). The yarn is then treated in a blank vat which contains per liter 5 grams of sodium dithionite and 12 ml. of caustic soda solution (38° Bé.), together with the same amount of undyed cotton skein yarn without further additions at the liquor ratio 20:1 at 60° C. for 45 minutes. The initially undyed material is scarcely colored after this treatment. If however there is added to the blank vat 0.5 g./l. of the oligomeric acid amide derived from dipropyl ether $\gamma,\gamma'$-dicarboxylic acid and dipropylene triamine according to Example I, the dye begins to migrate after a very short time and the originally white textile material is intensely dyed after a treatment of 45 minutes. Only very small amounts of dye remain in the liquor. The low dye loss in relation to the good leveling action achieved is surprising and of great economic advantage.

EXAMPLE 2

The superior action of the agents used according to this invention may be seen from the following comparative experiments:

Seven samples of cotton skein yarn are treated in seven different baths (a) to (g) with a dye combination of 0.35% of Indanthren gold orange 3G powder fine for dyeing (C.I. 69,025/1956) and 0.30% of Indanthren dark blue BOA powder fine for dyeing (C.I. 59,800/1956) according to the IW method in the following way:

Only one skein of the goods to be dyed is at first placed in the dyebath (liquor ratio 20:1) at 45° C. which is charged with the dye, 6 ml./l. sodium hydroxide solution (38° Bé.), 2.5 g./l. sodium dithinoite and 10 g./l. Glauber's salt (calcined), the second skein being added four minutes later. Both skeins are then dyed to completion with agitation of the material for 45 minutes at 45° C. and finished off as usual. The baths contain the following additions:

(a) no further additions
(b) 5 g./l. N-methylpyrrolidone
(c) 0.5 g./l. polymeric polyvinylpyrrolidone
(d) 5 g./l. of the betaine from pyridine and chloroacetic acid
(e) 0.4 g./l. of the polyglycol ether derived from 1 mole of oleyl alcohol and 25 moles of ethylene oxide
(f) 0.2 g./l. of the acid amide derived from acrylic acid and dipropylene triamine according to Example II
(g) 0.4 g./l. of the agent used in (f).

The two dyes have very different migratory powers and go on at different speeds. In the dyed sample (a) it can be clearly seen that the first skein is dyed mainly dark blue, i.e. that the component with the lower migratory power has remained at the places at which it was absorbed within the first minutes of the process, whereas the golden orange component has migrated. The second skein contains mainly the orange component besides small fractions of the blue component. The two skeins exhibit an extremely large difference in shade. The action of the leveling agent may be recognized from the shades of the two skeins dyed in the same bath. The more similar they are to each other, the better the action of the leveling agent. In dyeing (f) the skeins are almost identical in shade and in dyeing (g) they are practically completely identical in shade. The known agents used in dyeings (b) and (d) have only slight action although they have been used in considerably larger amounts. Polyvinylpyrrolidone (dyeing (c)) cannot be used as a leveling agent; by reason of the high dye affinity, a dyeing weak in color results which moreover exhibits considerable differences in shade between the two skeins. The so-called non-ionic leveling agents which have long been known (used for dyeing (e)), bring about a clearly detectable leveling effect, but by reason of the strongly pronounced retarding action, the shade is displaced; a shade results in which the orange component predominates, without the difference in shade between the two skeins being sufficiently leveled.

EXAMPLE 3

Warp beams of cotton are dyed for 45 minutes at 60° C. in a closed dyeing apparatus (according to Obermaier) by the IN method at the liquor ratio 10:1 with 2% of Indanthren FFB power fine for dyeing (C.I. 70,305/1956) with the addition of 5 g./l. of sodium dithionite and 12 ml./l. of sodium hydroxide solution (38° Bé.). This dye is known to have extremely poor leveling action and is normally not used for warp beam dyeing for this reason. Following the usual procedure, 0.75 g./l. of the acid amide derived from γ,γ'-thiodibutyric acid and diethylene triamine according to Example IV is added as the sole leveling agent. The wound package, after having been finished off in the usual way, exhibits excellent levelness and through-dyeing. Remarkably small amounts of dye remain in the residual liquor.

The condensation product prepared according to Example IV may be replaced as leveling agent for example by oligomeric acid amides derived from succinic acid and piperazine in the mole ratio 1:1.5 (Example V), from dipropylene ether γ,γ'-dicarboxylic acid and piperazine in the mole ratio 1:2 (Example I) and from nitrilotriacetic acid and diethylene triamine in the mole ratio 1:3 (Example XI).

EXAMPLE 4

Boiled knitted cotton goods in tube form are dyed in an automatic winch beck (according to Franke) at the liquor ratio 30:1 with 2% of Indanthren blue BC "Colloisol" (C.I. 69,825/1956) under the following conditions:

The liquor is charged at about 20° C. with the additions, necessary for the IN method, of 14 ml./l. caustic soda solution (38° Bé.) and 5 g./l. sodium dithionite, 1 g./l. of the oligomeric acid amide derived from γ,γ'-thiodibutyric acid and N-methyldipropylene triamine in the mole ratio 1:1 (according to Example X) and the calculated amount of dye in the form of a suspension in water are added. The material is treated in the dye liquor at 20° C. for 20 minutes, then the bath temperature is uniformly raised to 60° C. within 30 minutes, 1 g./l. of triethanolamine and 0.5 g./l. of sodium nitrite added and the bath brought to 80° C. within 10 minutes. After another 10 minutes at 80° C., the dyeing is ended and the liquor contains only small amounts of dye. After finishing off in the usual way, the tubular goods exhibit unobjectionable levelness and through-dyeing which may be seen from the fact that the inner and outer sides of the material do not show any difference in shade. The shade is clear and pure.

EXAMPLE 5

Cotton mackintosh poplin is dyed on an automatic jigger. The fabric, previously padded on a pad with 0.5% of Indanthren olive T powder fine for dyeing (C.I. 69,525/1956) is developed on the jigger at the liquor ratio 5:1 according to the IN method. Besides the usual additions of 25 ml./l. sodium hydroxide solution (38° Bé.), 5.5 g./l. sodium dithionite and padding liquor, no other auxiliaries are present in the development bath except 1.25 g./l. of the acid amide derived from dipropyl ether γ,γ'-dicarboxylic acid and dipropylene triamine according to Example I. A level and through-dyed material is obtained which exhibits a remarkably solid appearance. A slight retarding action of the leveling agent is without importance.

EXAMPLE 6

Staple fiber yarn is dyed in a vat with 20% of a violet sulfur dye (C.I. 53,440/1956) at a liquor ratio of 30:1 at 95° C. with 8% of soda, 60% of sodium sulfide and 50% of Glauber's salt for 1½ hours. The dye tends to bronze, is fast to rubbing and non-level. A fully satisfactory dyeing is obtained, if 0.5 g./l. of the oligomeric acid amide obtainable according to Example XI from nitrilotriacetic acid and piperazine is added to the dyebath as leveling agent.

The oligomeric acid amide derived from ethylenediaminotetracetic acid and piperazine in the mole ratio 1:4 according to Example XII may be used as leveling agent with the same result.

EXAMPLE 7

Boiled cotton poplin is dyed at 60° C. on a jigger at a liquor ratio of 1:5 in the usual way according to the IN method with a combination of 1.2% of Indanthren olive green B powder fine for dyeing (C.I. 69,500/1956) and 1% of Indanthren yellow 3R powder fine for dyeing (C.I. 70,805/1956). The goods have a non-level appearance and in particular there are strong differences in shade between the inner and outer layers of the fabric. The olive-green component is fixed on the outside. The goods cannot be further processed because the yellow component predominates very strongly at the seams. By using 2 g./l. of the oligomeric acid amide derived from acrylic acid and dipropylene triamine according to Example III as leveling agent under otherwise identical conditions, a material dyed with good penetration and with a level shade is obtained which satisfies all requirements.

EXAMPLE 8

Staple fiber yarn is dyed according to the IN method on a mechanical yarn dyeing machine (according to Gerber) with 2% of Indanthren brilliant green GG powder fine highly concentrated for dyeing (C.I. 59,830/1956) in an industrial water of about 8° (German) hardness, there being added to the dyebath 0.5 g./l. of the oligomeric acid amide derived from suberic acid and piperazine in the mole ratio 1:1.5 according to Example VIII and, as protective colloid for the dyeing in hard water, 1 g./l. of the reaction product of sulfite waste liquor and dichlorodiethyl ether obtainable according to U.S. patent specification No. 2,317,832. The dye goes slowly and uniformly onto the fiber. During the dyeing process, no troublesome foam is formed. The yarn does not float. The end liquor contains no appreciable amounts of dye. The yarn, after the usual finishing off, is dyed level with good penetration. The shade is not undesirably changed. If dyeing is effected without addition of auxiliaries, the dye goes on very rapidly and the dyeing is non-level. If a surface-active leveling agent is used, for example the polyglycol ether of a fatty alcohol or fatty amine or a quaternary ammonium compound of an oxyethylate fatty amine, the dyeings obtained are also level, but they deviate considerably from the desired shade. Apart from the fact that the dyeing is substantially paler by reason of the strong retarding action of the said surface-active leveling agent, the shade is displaced very strongly toward yellow. Furthermore, the dyebath foams so that the yarn floats on the surface. Mechanical manipulation of the goods is thereby made difficult and in some cases quite impossible. In the latter case, no level dyeing can be achieved even when using one of the said polyglycol ethers as auxiliary.

We claim:

1. In a process for dyeing textile materials with vat and sulfur dyes the improvement comprising leveling the dyeings by contacting the dyed textile materials in an alkaline vat with a water-soluble polyamide having a mean molecular weight between 600 and 1500, said polyamide being derived from (a) a polyamine of the general formula

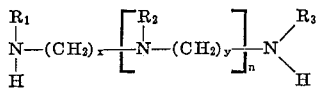

where $R_1$ and $R_3$ are members selected from the group consisting of hydrogen, alkyl with 1 to 4 carbon atoms and hydroxyalkyl with 1 to 4 carbon atoms and, when $x$ is 2 and $n$ is 0, may together represent an ethylene radical; $R_2$ is a member selected from the group consisting of hydrogen, alkyl with 1 to 4 carbon atoms and hydroxyalkyl with 1 to 4 carbon atoms; each of $x$ and $y$ is one of the integers 1 to 6, $n$ being one of the integers 0 to 20 and the sum of $x$ and $n$ is at least 2; and from (b) a member selected from the group consisting of acids of the general formulae

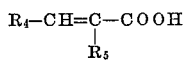

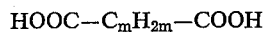

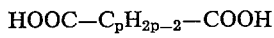

and

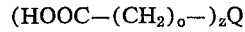

where $R_4$ is a member selected from the group consisting of hydrogen and alkyl with 1 to 3 carbon atoms; $R_5$ is a member selected from the group consisting of hydrogen and methyl, Q is a member selected from the group consisting of —O—, —S—

and

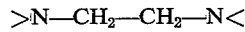

$m$ is one of the integers 1 to 6; $p$ is one of the integers 2 to 6; $o$ is one of the integers 1 to 3, and $z$ represents the number of valencies of Q, and from the acid amides and acid esters of the above polycarboxylic acids.

2. In a process for dyeing textile materials with vat and sulfur dyes the improvement comprising leveling the dyeings by contacting the dyed textile materials in an alkaline vat with a water-soluble polyamide derived from acrylic acid and piperazine, said water-soluble polyamide having a mean molecular weight between 600 to 1500, the ratio of said acrylic acid to said piperazine being such that a total of 0.7 to 3 amino groups selected from the group consisting of primary and secondary amino groups are available for each carboxyl group and each reactive double bond.

3. In a process for dyeing textile materials with vat and sulfur dyes the improvement comprising leveling the dyeings by contacting the dyed textile materials in an alkaline vat with a water-soluble polyamide derived from acrylic acid and dipropylene triamine, said water-soluble polyamide having a mean molecular weight between 600 to 1500, the ratio of said acrylic acid to said dipropylene triamine being such that a total of 0.7 to 3 amino groups selected from the group consisting of primary and secondary amino groups are available for each carboxyl group and each reactive double bond.

4. In a process for dyeing textile materials with vat and sulfur dyes the improvement comprising leveling the dyeings by contacting the dyed textile materials in an alkaline vat with a water-soluble polyamide derived from dipropyl ether γ,γ'-dicarboxylic acid and dipropylene triamine, said water-soluble polyamide having a mean molecular weight between 600 to 1500, the ratio of said dipropyl ether γ,γ'-dicarboxylic acid to said dipropylene triamine being such that a total of 1 to 3 amino groups selected from the group consisting of primary and secondary amino groups are available for each carboxyl group and each reactive double bond.

5. In a process for dyeing textile materials with vat and sulfur dyes the improvement comprising leveling the dyeings by contacting the dyed textile materials in an alkaline vat with a water-soluble polyamide derived from thiodibutyric acid and diethylene triamine, said water-soluble polyamide having a mean molecular weight between 600 to 1500, the ratio of said thiodibutyric acid to said diethylene triamine being such that a total of 1 to 3 amino groups selected from the group consisting of primary and secondary amino groups are available for each carboxyl group and each reactive double bond.

6. In a process for dyeing textile materials with vat and sulfur dyes the improvement comprising leveling the dyeings by contacting the dyed textile materials in an alkaline vat with a water-soluble polyamide derived from thiodibutyric acid and N-methyldipropylene triamine, said water-soluble polyamide having a mean molecular weight between 600 to 1500, the ratio of said thiodibutyric acid to said N-methyldipropylene triamine being such that a total of 1 to 3 amino groups selected from the group consisting of primary and secondary amino groups are available for each carboxyl group and each reactive double bond.

7. In a process for dyeing textile materials with vat and sulfur dyes the improvement comprising leveling the dyeings by contacting the dyed textile materials in an alkaline vat with a water-soluble polyamide derived from dipropyl ether γ,γ'-dicarboxylic acid and piperazine, said water-soluble polyamide having a mean molecular weight between 600 to 1500, the ratio of said dipropyl ether γ,γ'-dicarboxylic acid to said piperazine being such that a total of 1 to 3 amino groups selected from the group consisting of primary and secondary amino groups are available for each carboxyl group and each reactive double bond.

8. A method of dyeing textiles by applying to the textiles an aqueous mixture of a vat dye and a low molecular weight polyamide which is soluble in water and is produced by the reaction of a dialkylene triamine with an alkylene dicarboxylic acid.

(References on following page)

References Cited

UNITED STATES PATENTS

| | | | |
|---|---|---|---|
| 2,155,135 | 4/1939 | Kartaschoff | 8—102 X |
| 3,033,813 | 5/1962 | Werner | 260—45.5 |
| 2,008,649 | 7/1934 | Ulrich | 8—87 |
| 2,359,867 | 10/1964 | Martin | 8—55 |
| 2,931,272 | 5/1960 | Haas | 8—4 |

FOREIGN PATENTS

| | | |
|---|---|---|
| 475,620 | 7/1951 | Canada. |
| 834,393 | 5/1960 | Great Britain. |

OTHER REFERENCES

J. Soc. Dyers and Colourists, vol. 76, No. 4, p. 252, April 1960.

Diserens: "Chemical Technology of Dyeing and Printing," vol. 1, 1948, pp. 127–135, pub. by Reinhold Pub. Corp., New York.

NORMAN G. TORCHIN, *Primary Examiner.*

MORRIS O. WOLK, *Examiner.*

DONALD LEVY, *Assistant Examiner.*

UNITED STATES PATENT OFFICE
CERTIFICATE OF CORRECTION

Patent No. 3,369,855                      February 20, 1968

Bjarne Hartmark et al.

It is certified that error appears in the above identified patent and that said Letters Patent are hereby corrected as shown below:

Column 4, approximately line 6, the portion of the formula reading "$NN_2$" should read -- $NH_2$ --; approximately line 7, the portion of the formula reading "$(CH_2)_2$" should read -- $(CH_2)_3$ --; approximately line 11, the portion of the formula reading "$(CH_2)_3$", each occurrence, should read -- $(CH_2)_2$ --. Column 11, line 5, "7/1934" should read -- 7/1935 --; line 6, "10/1964" should read -- 10/1944 --.

Signed and sealed this 16th day of December 1969.

(SEAL)
Attest:

Edward M. Fletcher, Jr.                      WILLIAM E. SCHUYLER, JR.
Attesting Officer                                Commissioner of Patents